United States Patent
Takamaru et al.

(10) Patent No.: US 9,690,155 B2
(45) Date of Patent: Jun. 27, 2017

(54) LIQUID CRYSTAL DISPLAY PANEL AND METHOD FOR PRODUCING SAME

(71) Applicant: Sharp Kabushiki Kaisha, Sakai, Osaka (JP)

(72) Inventors: Yutaka Takamaru, Sakai (JP); Seiji Kaneko, Sakai (JP); Takao Saitoh, Sakai (JP); Yohsuke Kanzaki, Sakai (JP); Keisuke Ide, Sakai (JP); Hiroshi Matsukizono, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/304,114

(22) PCT Filed: Apr. 9, 2015

(86) PCT No.: PCT/JP2015/061125
§ 371 (c)(1),
(2) Date: Oct. 14, 2016

(87) PCT Pub. No.: WO2015/159800
PCT Pub. Date: Oct. 22, 2015

(65) Prior Publication Data
US 2017/0038651 A1    Feb. 9, 2017

(30) Foreign Application Priority Data
Apr. 16, 2014   (JP) .................. 2014-084862

(51) Int. Cl.
*G02F 1/1362*    (2006.01)
*G02F 1/1333*    (2006.01)
(Continued)

(52) U.S. Cl.
CPC ...... *G02F 1/136227* (2013.01); *G02F 1/1362* (2013.01); *G02F 1/1368* (2013.01);
(Continued)

(58) Field of Classification Search
CPC ............. G02F 1/136227; G02F 1/1362; G02F 1/134363; G02F 1/133345; G02F 1/13439; G02F 1/1368
See application file for complete search history.

(56) References Cited

U.S. PATENT DOCUMENTS

2012/0138922 A1   6/2012   Yamazaki et al.
2014/0307195 A1   10/2014  Nakazawa et al.

FOREIGN PATENT DOCUMENTS

JP    09-152625 A     6/1997
JP    2001-345023 A   12/2001
(Continued)

*Primary Examiner* — Tracie Y Green
(74) *Attorney, Agent, or Firm* — Keating & Bennett, LLP (57) ABSTRACT

A TFT substrate (100A) of a liquid crystal display panel includes: an organic interlayer insulating layer (24) covering a TFT; a first transparent electrically-conductive layer (25) provided in the first region of a surface of the organic interlayer insulating layer (24); and an inorganic dielectric layer (26) covering the first transparent electrically-conductive layer (25) and provided in a second region of the surface of the organic interlayer insulating layer (24) which is different from the first region, the inorganic dielectric layer (26) containing SiN, wherein an arithmetic mean roughness Ra of the first region and the second region of the surface of the organic interlayer insulating layer (24) is not less than 3.45 nm and not more than 5.20 nm.

7 Claims, 4 Drawing Sheets

(51) Int. Cl.
*G02F 1/1368* (2006.01)
*G02F 1/1343* (2006.01)
(52) U.S. Cl.
CPC .... *G02F 1/13439* (2013.01); *G02F 1/133345* (2013.01); *G02F 1/134363* (2013.01)

(56) References Cited

FOREIGN PATENT DOCUMENTS

| | | |
|---|---|---|
| JP | 2012-134475 A | 7/2012 |
| WO | 2013/073143 A1 | 5/2013 |

LIQUID CRYSTAL DISPLAY PANEL AND METHOD FOR PRODUCING SAME

TECHNICAL FIELD

The present invention relates to a liquid crystal display panel and a manufacturing method thereof.

BACKGROUND ART

A liquid crystal display panel has been known in which, to improve the aperture ratio of liquid crystal display panel, an organic interlayer insulating layer is provided over thin film transistors (hereinafter, "TFTs"), gate bus lines, and source bus lines, and pixel electrodes are provided on the organic interlayer insulating layer (for example, Patent Documents 1 and 2).

In liquid crystal display panels of recent years, the vertical alignment mode (VA mode) and the lateral electric field mode (also known as "IPS mode") represented by the fringe field switching mode (hereinafter, "FFS mode") have been widely used because of their wide viewing angle characteristics. Patent Document 3 discloses a liquid crystal display panel which includes a first transparent electrically-conductive layer provided on an organic interlayer insulating layer, an inorganic dielectric layer provided on the first transparent electrically-conductive layer, and a second transparent electrically-conductive layer provided on the inorganic dielectric layer. The second transparent electrically-conductive layer is, for example, a pixel electrode which has a plurality of linear portions extending parallel with one another. The second transparent electrically-conductive layer typically has a plurality of slits. The first transparent electrically-conductive layer is a solid common electrode (also known as "counter electrode") which does not have slits or openings, for example. The first transparent electrically-conductive layer, the inorganic dielectric layer, and the second transparent electrically-conductive layer form storage capacitance.

CITATION LIST

Patent Literature

Patent Document 1: Japanese Laid-Open Patent Publication No. 9-152625
Patent Document 2: Japanese Laid-Open Patent Publication No. 2001-345023
Patent Document 3: WO 2013/073143

SUMMARY OF INVENTION

Technical Problem

The present inventors manufactured a liquid crystal display panel which has the above-described multilayer structure of the second transparent electrically-conductive layer/the inorganic dielectric layer/the first transparent electrically-conductive layer/the organic interlayer insulating layer (this representation means that the second transparent electrically-conductive layer is the uppermost layer, the layer level decreases in order of appearance, and the organic interlayer insulating layer is the lowermost layer). The present inventors sometimes found bubbles generated in the liquid crystal layer when the liquid crystal display panel was used for a long time period. According to research conducted by the present inventors, as will be described later, this problem is a new problem which arises when the inorganic dielectric layer is provided on the organic interlayer insulating layer.

The present invention was conceived in order to solve the above-described problem, specifically in order to suppress generation of bubbles in a liquid crystal display panel which includes an inorganic dielectric layer on an organic interlayer insulating layer.

Solution to Problem

A liquid crystal display panel according to an embodiment of the present invention includes: a liquid crystal layer; first and second substrates arranged so as to oppose each other via the liquid crystal layer; a thin film transistor supported on the first substrate; an organic interlayer insulating layer covering the thin film transistor; a first transparent electrically-conductive layer provided in a first region of a surface of the organic interlayer insulating layer; and an inorganic dielectric layer covering the first transparent electrically-conductive layer and provided in a second region of the surface of the organic interlayer insulating layer which is different from the first region, the inorganic dielectric layer containing SiN, wherein an arithmetic mean roughness Ra of the first region and the second region of the surface of the organic interlayer insulating layer is not less than 3.45 nm and not more than 5.20 nm.

In one embodiment, an arithmetic mean roughness Ra of a surface of the first transparent electrically-conductive layer is not less than 3.75 nm and not more than 6.30 nm.

In one embodiment, the liquid crystal display panel further includes a second transparent electrically-conductive layer on the inorganic dielectric layer.

In one embodiment, the second transparent electrically-conductive layer is connected with a drain electrode of the thin film transistor in a contact hole which includes a first contact hole of the organic interlayer insulating layer and a second contact hole of the inorganic dielectric layer, an inner perimeter surface of the first contact hole being covered with the inorganic dielectric layer.

In one embodiment, the second transparent electrically-conductive layer is connected with a drain electrode of the thin film transistor in a contact hole which includes a first contact hole of the organic interlayer insulating layer and a second contact hole of the inorganic dielectric layer, the first contact hole and the second contact hole intersecting with each other when viewed in a direction normal to the first substrate.

A liquid crystal display panel manufacturing method according to an embodiment of the present invention is a manufacturing method of a liquid crystal display panel which includes a liquid crystal layer and first and second substrates arranged so as to oppose each other via the liquid crystal layer, the method including the steps of: providing a first substrate; forming a thin film transistor on the first substrate; forming an organic interlayer insulating layer so as to cover the thin film transistor; ashing a surface of the organic interlayer insulating layer, thereby forming a first region and a second region of which an arithmetic mean roughness Ra is not less than 3.45 nm and not more than 5.20 nm; forming a first transparent electrically-conductive layer on the first region of the organic interlayer insulating layer; and forming, by CVD, an inorganic dielectric layer so as to cover the first transparent electrically-conductive layer and to be provided in the second region of the surface of the organic interlayer insulating layer which is different from the first region, the inorganic dielectric layer containing SiN.

In one embodiment, the ashing is performed in a gas atmosphere which contains oxygen.

Advantageous Effects of Invention

According to an embodiment of the present invention, a liquid crystal display panel in which generation of bubbles in the liquid crystal layer is suppressed and a manufacturing method of such a liquid crystal display panel are provided.

BRIEF DESCRIPTION OF DRAWINGS

FIG. 1 (a) is a schematic plan view of a TFT substrate 100A included in a liquid crystal display panel according to an embodiment of the present invention, showing a structure corresponding to one pixel (dot). (b) is a schematic cross-sectional view taken along line 1B-1B' of (a). (c) is a schematic cross-sectional view taken along line 1C-1C' of (a).

FIG. 2 (a) to (d) are images of a surface of an organic interlayer insulating layer 24 observed through an atomic force microscope. (a) is an AFM image of a surface without being subjected to ashing. (b) to (d) are AFM images of surfaces for which the ashing durations were 30 seconds, 60 seconds, and 90 seconds, respectively.

FIG. 3 (a) to (d) are a surface of a storage capacitance electrode 25 observed through an atomic force microscope. (a) is an AFM image of a surface without being subjected to ashing. (b) to (d) are AFM images of surfaces for which the ashing durations were 30 seconds, 60 seconds, and 90 seconds, respectively. (e) shows a SEM image of a cross section of a TFT substrate.

FIG. 4 (a) is a schematic plan view of another TFT substrate 100B included in a liquid crystal display panel according to an embodiment of the present invention, showing a structure corresponding to one pixel (dot). (b) is a schematic cross-sectional view taken along line 4B-4B' of (a). (c) is a schematic cross-sectional view taken along line 4C-4C' of (a).

DESCRIPTION OF EMBODIMENTS

Hereinafter, a liquid crystal display panel and a manufacturing method thereof according to an embodiment of the present invention are described with reference to the drawings. Note that, however, the liquid crystal display panel and the manufacturing method thereof according to an embodiment of the present invention are not limited to illustrated examples.

Figure 1:
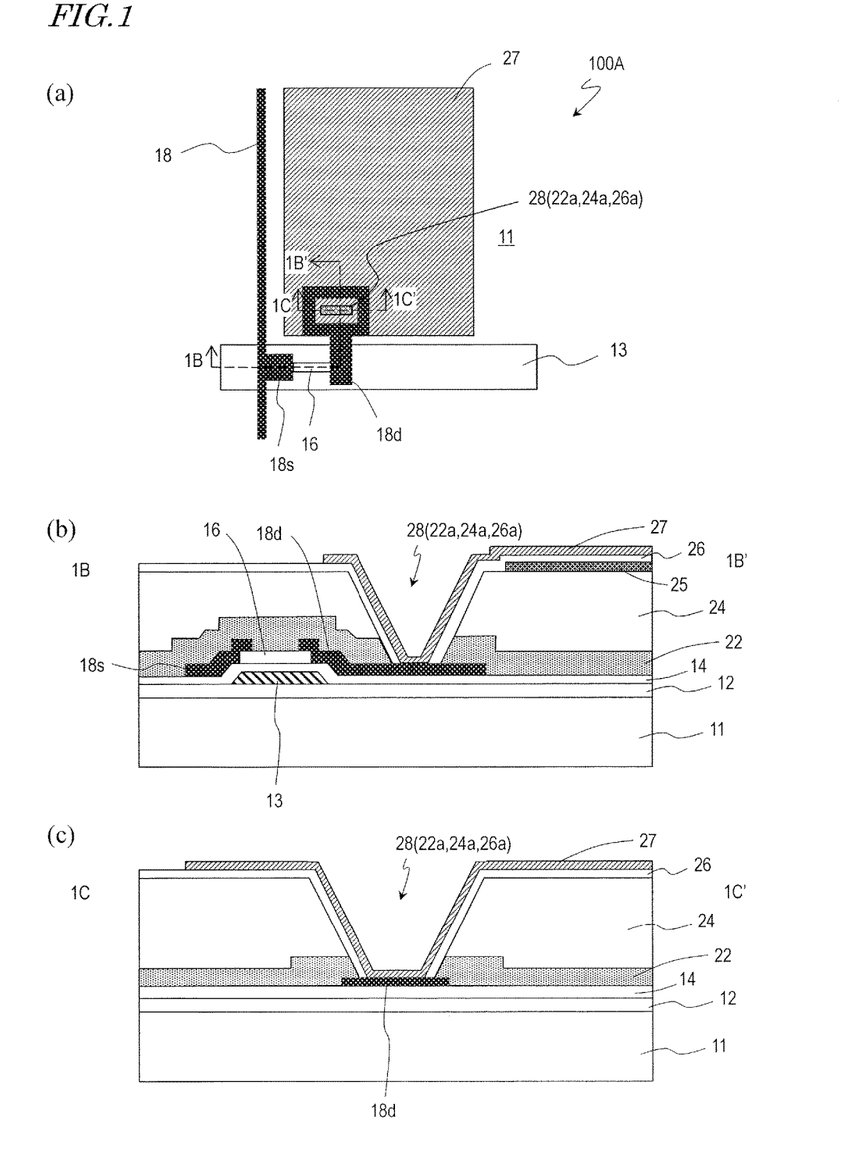
Figure 2:
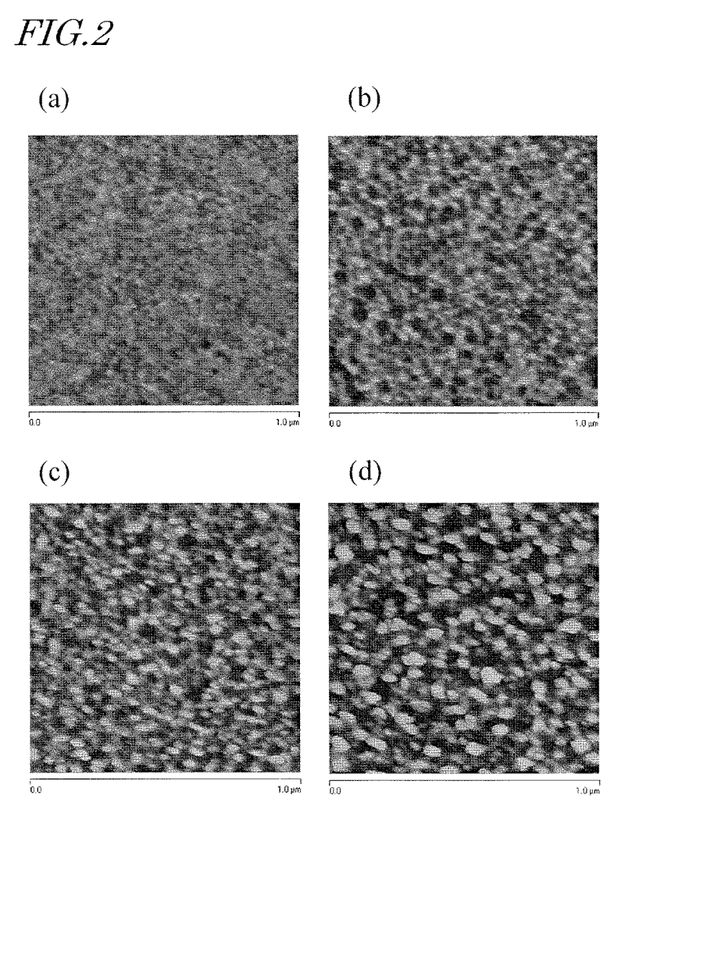

FIGS. 1(a) to 1(c) illustrate a schematic configuration of a TFT substrate 100A included in a liquid crystal display panel according to an embodiment of the present invention. A TFT substrate included in a liquid crystal display panel of a comparative example has the same configuration as that of the TFT substrate 100A except that the surface roughness of the organic interlayer insulating layer is not in a predetermined range. Therefore, we refer to FIGS. 1(a) to 1(c) also in the description of the liquid crystal display panel of the comparative example.

FIG. 1(a) is a schematic plan view of the TFT substrate 100A included in a liquid crystal display panel according to an embodiment of the present invention, showing a structure corresponding to one pixel (dot). FIG. 1(b) is a schematic cross-sectional view taken along line 1B-1B' of FIG. 1(a). FIG. 1(c) is a schematic cross-sectional view taken along line 1C-1C' of FIG. 1(a).

Although not illustrated in the drawings for the sake of simplicity, the liquid crystal display panel according to an embodiment of the present invention further includes a counter substrate which is arranged so as to oppose the TFT substrate 100A and a liquid crystal layer provided between the TFT substrate 100A and the counter substrate. The counter substrate includes, for example, a glass substrate, a color filter layer provided on the liquid crystal layer side of the glass substrate, and a black matrix (light shield layer). A surface of the TFT substrate 100A and a surface of the counter substrate which are in contact with the liquid crystal layer are typically provided with alignment films. In addition, the outer side of the TFT substrate 100A and the outer side of the counter substrate are provided with polarizers and retarders. The liquid crystal display panel according to an embodiment of the present invention is, for example, a VA or FFS mode liquid crystal display panel. The components of the liquid crystal display panel other than the TFT substrate 100A may be the same as those of known liquid crystal display panels. These components are well known to those skilled in the art, and therefore, the descriptions thereof are herein omitted. Known VA mode and FFS mode liquid crystal display panels are disclosed in, for example, Patent Document 3. The entire disclosure of Patent Document 3 is incorporated by reference in this specification. Hereinafter, the TFT substrate 100A for use in a VA mode liquid crystal display panel is described.

The TFT substrate 100A includes: a TFT supported on a substrate (e.g., glass substrate) 11; an organic interlayer insulating layer 24 covering the TFT; a first transparent electrically-conductive layer 25 provided in a first region of a surface of the organic interlayer insulating layer 24; and an inorganic dielectric layer 26 covering the first transparent electrically-conductive layer 25 and provided in a second region of the surface of the organic interlayer insulating layer 24 which is different from the first region, the inorganic dielectric layer 26 containing SiN, wherein the arithmetic mean roughness Ra across the first region and the second region of the surface of the organic interlayer insulating layer 24 is not less than 3.45 nm and not more than 5.20 nm. In the TFT substrate 100A, part of the surface of the organic interlayer insulating layer 24 which is in direct contact with the first transparent electrically-conductive layer 25 is referred to as "first region", and another part of the surface of the organic interlayer insulating layer 24 which is in direct contact with the inorganic dielectric layer 26 that contains SiN is referred to as "second region". The arithmetic mean roughness Ra across the first and second regions of the surface of the organic interlayer insulating layer 24 is controlled so as to be not less than 3.45 nm and not more than 5.20 nm. Typically, after the organic interlayer insulating layer 24 has been formed, the entire surface of the organic interlayer insulating layer 24 is subjected to ashing in an atmosphere containing oxygen, prior to formation of the first transparent electrically-conductive layer 25, whereby the arithmetic mean roughness Ra across the entire surface of the organic interlayer insulating layer 24 is controlled so as to fall within the above-described range. When the arithmetic mean roughness Ra across the surface of the organic interlayer insulating layer 24 is within the above-described range, generation of bubbles in the liquid crystal layer is suppressed. The same also applies to another liquid crystal display panel according to an embodiment of the present invention which includes a TFT substrate 100B shown in FIG. 4.

The configuration of the TFT substrate 100A, and the above-described advantages achieved by that configuration, are described with reference to FIGS. 1(a) to 1(c).

The TFT substrate 100A includes a bottom gate type TFT supported on a substrate 11. An inorganic protection layer 12, which can be omitted, is provided on the substrate 11. A gate electrode 13 and a gate bus line 13 are provided on the inorganic protection layer 12. Here, the gate electrode 13 is formed as part of the gate bus line 13, and therefore, these elements are designated by the same reference numeral for the sake of simplicity. On the gate electrode 13, a gate insulating layer 14 is provided so as to cover substantially the entire surface of the substrate 11. A semiconductor layer 16 is provided so as to oppose the gate electrode 13 via the gate insulating layer 14. A source electrode 18s and a drain electrode 18d are provided on the semiconductor layer 16. Portions of the semiconductor layer 16 which are in contact with the source electrode 18s and the drain electrode 18d form a source region and a drain region, respectively, thereby forming a TFT. That is, the TFT includes the gate electrode 13, the gate insulating layer 14, the semiconductor layer 16, the source electrode 18s, and the drain electrode 18d. A source bus line 18 integrally formed of the same electrically-conductive film as the source electrode 18s (source metal layer). Note that the configuration of the TFT is not limited to that illustrated herein. A TFT selected from a wide variety of known TFTs can be used.

An inorganic insulating layer 22 is provided so as to cover the TFT, a gate metal layer (formed of the same electrically-conductive film as the gate bus line 13), and the source metal layer. The organic interlayer insulating layer 24 is provided on the inorganic insulating layer 22. The organic interlayer insulating layer 24 also functions as a flattening film. The arithmetic mean roughness Ra across the surface of the organic interlayer insulating layer 24 is not less than 3.45 nm and not more than 5.20 nm. The first transparent electrically-conductive layer 25 is provided on the surface of the organic interlayer insulating layer 24. The TFT substrate 100A illustrated herein is a TFT substrate 100A for use in a VA mode liquid crystal display panel. The first transparent electrically-conductive layer 25 is a storage capacitance electrode. The storage capacitance electrode 25 is typically common to all pixels and therefore extends over substantially the entire surface of the TFT substrate 100A. The storage capacitance electrode 25 has an opening when necessary.

The inorganic dielectric layer 26 that covers the storage capacitance electrode 25 is provided over substantially the entire surface of the substrate 11. The inorganic dielectric layer 26 is in direct contact with the organic interlayer insulating layer 24 in a region (second region) of the surface of the organic interlayer insulating layer 24 which is different from a region (first region) in which the storage capacitance electrode 25 is provided.

A second transparent electrically-conductive layer 27 is provided in a predetermined region on the inorganic dielectric layer 26. In the example described hereinbelow, the second transparent electrically-conductive layer 27 is a pixel electrode. The pixel electrode 27, the storage capacitance electrode 25, and the inorganic dielectric layer 26 that is present between the pixel electrode 27 and the storage capacitance electrode 25 form storage capacitance. The storage capacitance electrode 25 is supplied with a common voltage which is to be supplied to a counter electrode provided in the counter substrate (a substrate which is arranged so as to oppose the TFT substrate 100A via the liquid crystal layer). Since the storage capacitance electrode 25 is transparent, even when the storage capacitance electrode 25 is present in the pixel region, its effect on the pixel aperture ratio of the liquid crystal display panel is small. The area of a portion of the storage capacitance electrode 25 which forms storage capacitance (i.e., a portion of the storage capacitance electrode 25 which opposes the pixel electrode 27 via the inorganic dielectric layer 26) is adjusted according to the storage capacitance value required of the liquid crystal display panel.

In a contact hole 28, the pixel electrode 27 is in contact with the drain electrode 18d. The contact hole 28 includes a contact hole 22a formed in the inorganic insulating layer 22, a contact hole 24a formed in the organic interlayer insulating layer 24, and a contact hole 26a formed in the inorganic dielectric layer 26. The inner perimeter surface of the contact hole 24a of the organic interlayer insulating layer 24 is covered with the inorganic dielectric layer 26. The pixel electrode 27 provided on the inorganic dielectric layer 26 also extends over part of the inorganic dielectric layer 26 which covers the inner perimeter surface of the contact hole 24a, and is in contact with the drain electrode 18d in the contact hole 26a of the inorganic dielectric layer 26.

When the TFT substrate 100A is used in a FFS mode liquid crystal display panel, for example, the first transparent electrically-conductive layer 25 functions as a common electrode (counter electrode) 25, such that a lateral electric field (fringe electric field) is generated between the common electrode 25 and the pixel electrode 27 that has a plurality of linear portions extending parallel with one another. On the contrary, the first transparent electrically-conductive layer 25 may be used as a pixel electrode 25 while the second transparent electrically-conductive layer 27 is used as a common electrode (counter electrode) 27.

Here, the illustrated TFT substrate 100A can be manufactured by a known method using known materials.

The inorganic protection layer 12, which is provided when necessary, can be formed in the same way as the gate insulating layer 14 or the inorganic insulating layer 22 as will be described later. The inorganic protection layer 12 has, for example, the function of preventing diffusion of ions from the substrate 11. The thickness of the inorganic protection layer 12 is, for example, not less than 50 nm and not more than 200 nm.

As the material of the gate metal layer, a metal, such as aluminum (Al), tungsten (W), molybdenum (Mo), tantalum (Ta), chromium (Cr), titanium (Ti), copper (Cu), or the like, an alloy thereof, or a nitride thereof, may be used. The gate metal layer is, for example, formed by sputtering. The gate electrode 13 and the gate bus line 13 can be formed by photolithographically patterning the gate metal layer. The thickness of the gate metal layer is, for example, not less than 100 nm and not more than 400 nm.

As the material of the gate insulating layer 14, for example, silicon dioxide ($SiO_2$), silicon nitride ($SiN_x$), silicon oxynitride ($SiO_xN_y$, $x>y$), silicon nitroxide ($SiN_xO_y$, $x>y$), or the like, can be used. The gate insulating layer 14 may be a single layer film or may be a multilayer film. The gate insulating layer 14 is formed by, for example, CVD and/or sputtering. The thickness of the gate insulating layer 14 is, for example, not less than 100 nm and not more than 500 nm.

The semiconductor layer 16 is, for example, an oxide semiconductor layer. The oxide semiconductor layer includes, for example, a semiconductor which is based on In—Ga—Zn—O elements (hereinafter, abbreviated as "In—Ga—Zn—O based semiconductor"). Here, the In—Ga—Zn—O based semiconductor is a ternary oxide consisting of In (indium), Ga (gallium) and Zn (zinc). The proportion (composition ratio) of In, Ga and Zn is not particularly limited but includes, for example, In:Ga:Zn=2:2:1, In:Ga:Zn=1:1:1, and In:Ga:Zn=1:1:2. In the present embodiment, the oxide semiconductor layer may be an In—Ga—Zn—O based semiconductor layer which includes In, Ga and Zn in a proportion of In:Ga:Zn=1:1:1, for example.

A TFT which includes an In—Ga—Zn—O based semiconductor layer has high mobility (20 times or more as compared with an a-Si TFT) and low current leakage (less than 1/100 as compared with an a-Si TFT) and is therefore suitably used as a driver TFT and a pixel TFT. When a TFT which includes an In—Ga—Zn—O based semiconductor layer is used, the power consumption of a liquid crystal display panel can be greatly reduced.

The In—Ga—Zn—O based semiconductor may be amorphous or may include a crystalline portion. As the crystalline In—Ga—Zn—O based semiconductor, a crystalline In—Ga—Zn—O based semiconductor in which the c-axis is oriented generally perpendicular to the layer surface is preferred. The crystalline structure of such an In—Ga—Zn—O based semiconductor is disclosed in, for example, Japanese Laid-Open Patent Publication No. 2012-134475. The entire disclosure of Japanese Laid-Open Patent Publication No. 2012-134475 is incorporated by reference in this specification.

The oxide semiconductor layer may include a different oxide semiconductor instead of the In—Ga—Zn—O based semiconductor. For example, the oxide semiconductor layer may include a Zn—O based semiconductor (ZnO), an In—Zn—O based semiconductor (IZO (registered trademark)), a Zn—Ti—O based semiconductor (ZTO), a Cd—Ge—O based semiconductor, a Cd—Pb—O based semiconductor, a CdO (cadmium oxide), a Mg—Zn—O based semiconductor, an In—Sn—Zn—O based semiconductor (e.g., $In_2O_3$—$SnO_2$—ZnO), an In—Ga—Sn—O based semiconductor, or the like.

The semiconductor layer 16 is not limited to the oxide semiconductor layer but may be made of a silicon material, such as amorphous silicon, polysilicon, microcrystalline silicon, continuous grain silicon, or the like. The thickness of the semiconductor layer 16 is, for example, not less than 10 nm and not more than 100 nm.

As the material of the source metal layer, a metal, such as aluminum (Al), molybdenum (Mo), copper (Cu), titanium (Ti), or the like, an alloy thereof, or a nitride thereof, may be used. The source metal layer is not limited to a single layer film which is made of the above-described materials but may be a multilayer film which is made of the above-described materials. The source metal layer may be transparent. The source metal layer may be made of, for example, a light-transmitting electrically-conductive material, such as indium tin oxide (ITO), indium zinc oxide (IZO (registered trademark); hereinafter, InZnO-based transparent electrically-conductive material), indium tin oxide containing silicon oxide (ITSO), indium oxide ($In_2O_3$), tin oxide ($SnO_2$), zinc oxide (ZnO), titanium oxide, or the like. Alternatively, these materials may be appropriately used in combination. The source metal layer is formed by, for example, sputtering. A source metal layer including the source electrode 18s, the drain electrode 18d, etc., is formed by patterning the source metal layer. The thickness of the source metal layer is, for example, not less than 100 nm and not more than 400 nm.

As the material of the inorganic insulating layer 22, for example, silicon dioxide ($SiO_2$), silicon nitride ($SiN_x$), silicon oxynitride ($SiO_xN_y$, x>y), silicon nitroxide ($SiN_xO_y$, x>y), or the like, can be used. The inorganic insulating layer 22 may be a single layer film or may be a multilayer film consisting of two or more layers. The inorganic insulating layer 22 is formed by, for example, CVD. The thickness of the inorganic insulating layer 22 is, for example, not less than 150 nm and not more than 700 nm.

As the material of the organic interlayer insulating layer 24, for example, a photosensitive resin material can be used. The photosensitive resin material is, for example, a positive photosensitive resin material (e.g., acrylic resin material). A negative photosensitive resin material can also be used. The photosensitive resin material is applied to the inorganic insulating layer 22 by application or printing, and thereafter, the film of the photosensitive resin material is photolithographically patterned, whereby the organic interlayer insulating layer 24 which has the contact hole 24a is formed. In the contact hole 24a, the inorganic insulating layer 22 is exposed. The thickness of the organic interlayer insulating layer 24 is, for example, not less than 2 μm and not more than 4 μm. Thereafter, the inorganic insulating layer 22 is dry-etched using the organic interlayer insulating layer 24 as a mask, whereby the contact hole 22a is formed in the inorganic insulating layer 22. In the contact holes 22a, 24a, the drain electrode 18d is exposed.

Thereafter, the surface of the organic interlayer insulating layer 24 is subjected to ashing, prior to formation of the storage capacitance electrode 25. The ashing is performed such that the arithmetic mean roughness Ra across the surface of the organic interlayer insulating layer 24 is not less than 3.45 nm and not more than 5.20 nm. The ashing is preferably performed in a gas atmosphere which contains oxygen. For example, as will be specifically described later with experimental examples, a surface which has the above-described predetermined roughness can be formed by performing the ashing under the conditions that the RF power is 2000 W, the pressure is 30 mTorr, the oxygen flow rate is 50 sccm, and the application duration is 60 s. When the ashing is performed in a gas atmosphere which contains oxygen, a surface of the organic interlayer insulating layer 24 is oxidized, and becomes hydrophilic, so as to have improved adhesion to the storage capacitance electrode 25 and the inorganic dielectric layer 26.

The storage capacitance electrode 25 is formed using a transparent electrically-conductive material. As the transparent electrically-conductive material, an InZnO-based transparent electrically-conductive material, indium tin oxide (ITO), or the like, can be used. The storage capacitance electrode 25 is formed by, for example, photolithographically patterning a layer of the transparent electrically-conductive material which is formed by sputtering. The thickness of the storage capacitance electrode 25 is, for example, not less than 50 nm and not more than 150 nm.

For example, as will be specifically described later with experimental examples, when a transparent electrically-conductive layer, which is to become the storage capacitance electrode 25, is deposited using a InZnO-based transparent electrically-conductive material on the surface of the organic interlayer insulating layer 24 whose arithmetic mean roughness Ra is not less than 3.45 nm and not more than 5.20 nm under the conditions that the DC power is 1 W/cm$^2$, the oxygen partial pressure is 5%, 0.6 Pa, the deposition duration is 200 s, the resultant transparent electrically-conductive layer has a surface whose arithmetic mean roughness Ra is not less than 3.75 nm and not more than 6.30 nm. This transparent electrically-conductive layer is an amorphous layer which has a columnar structure and exhibits excellent adhesion to the organic interlayer insulating layer 24.

The inorganic dielectric layer 26 contains SiN and can be formed using, for example, silicon nitride ($SiN_x$), silicon oxynitride ($SiO_xN_y$, x>y), or silicon nitroxide ($SiN_xO_y$, x>y). Alternatively, the inorganic dielectric layer 26 may be realized by stacking the aforementioned layer(s) containing SiN and a layer of silicon dioxide ($SiO_2$). The thickness of the inorganic dielectric layer 26 is, for example, not less than 50 nm and not more than 400 nm.

The step of forming the inorganic dielectric layer 26 that contains SiN includes CVD steps in which $SiH_4$ and $NH_3$ are used as reactant gases. According to research conducted by the present inventors, it was found that in this process the gases of $SiH_4$ and/or $H_2$ are taken into the organic interlayer insulating layer 24 and constitute a cause of generation of bubbles in the liquid crystal layer.

In the manufacturing method of the TFT 100A according to an embodiment of the present invention, the arithmetic mean roughness Ra across the surface of a region in which the organic interlayer insulating layer 24 is in contact with the storage capacitance electrode 25 or the inorganic dielectric layer 26 is controlled so as to be not less than 3.45 nm and not more than 5.20 nm. Therefore, the gas of $SiH_4$ or $H_2$ taken into the organic interlayer insulating layer 24 is prevented from being released from the organic interlayer insulating layer 24 during the use of the liquid crystal display panel.

The TFT substrate 100A illustrated herein has the pixel electrode 27 on the inorganic dielectric layer 26. The pixel electrode 27 is formed using a transparent electrically-conductive material as is the storage capacitance electrode 25. The pixel electrode 27 is formed so as to be in contact with the drain electrode 18d which is exposed in the contact hole 28 (22a, 24a, 26a) and is patterned so as to have a predetermined shape.

Thereafter, when necessary, an alignment film (not shown) is formed over substantially the entire surface so as to cover the liquid crystal layer side surface of the TFT substrate 100A, and provided to the assembly step of the liquid crystal display panel.

The present inventors produced TFT substrates according to the above-described manufacturing method of the TFT substrate 100A, without the step of ashing the surface of the organic interlayer insulating layer 24, or with varying ashing durations (30 seconds, 60 seconds, 90 seconds). The produced TFT substrates were used to manufacture liquid crystal display panels. Here, the produced TFT substrates are referred to, based on the ashing duration (seconds), as TFT substrate (0), TFT substrate (30), TFT substrate (60), and TFT substrate (90). The liquid crystal display panels manufactured using these TFT substrates are referred to as LCD (0), LCD(30), LCD(60), and LCD(90).

Specifically, the above-described TFT substrate included the following constituents. Note that the inorganic protection layer 12 was herein omitted.

Substrate 11: glass substrate, thickness 0.7 mm

Gate metal layer: W layer/TaN layer, thickness 400 nm (350 nm/50 nm), sputtering Gate insulating layer 14: $SiO_2$ layer, thickness 400 nm, sputtering Semiconductor layer 16: In—Ga—Zn—O based semiconductor layer, thickness 50 nm, sputtering Source metal layer: Ti/Al/Ti layers, thickness 400 nm (100 nm/200 nm/100 nm), sputtering Inorganic insulating layer 22: $SiO_2$ layer, thickness 250 nm, sputtering Organic interlayer insulating layer 24: positive acrylic resin layer, thickness 2 μm, post baking 220° C., 60 minutes Ashing conditions: RF power 2000 W, pressure 30 mTorr (4 Pa), oxygen flow rate 50 sccm, application duration 60 s Storage capacitance electrode 25: InZnO based transparent electrically-conductive layer, thickness 100 nm, sputtering Inorganic dielectric layer 26: silicon nitride ($SiN_x$) layer, thickness 200 nm, CVD FIGS. 2(a) to 2(d) show images of the surface of the organic interlayer insulating layer 24 observed through an atomic force microscope (AFM, manufactured by Bruker AXS K.K., "NanoscopeV") in the manufacturing process of TFT substrate (0), TFT substrate (30), TFT substrate (60), and TFT substrate (90). Each image has the size of 1 μm on each side. Through the AFM, the arithmetic mean roughness Ra and the root mean square roughness Rq across the surface of the organic interlayer insulating layer 24 were obtained. The results are shown in Table 1.

TABLE 1

| Ashing Duration | 0 sec | 30 sec | 60 sec | 90 sec |
|---|---|---|---|---|
| Arithmetic Mean Roughness Ra (nm) | 1.67 | 2.98 | 3.45 | 5.20 |
| Root Mean Square Roughness Rq (nm) | 2.10 | 3.73 | 4.35 | 6.67 |

As seen from FIGS. 2(a) to 2(d) and the results of Table 1, the surface roughness increases as the ashing duration increases.

FIGS. 3(a) to 3(d) show images of the surface of the storage capacitance electrode (first transparent electrically-conductive layer) 25 observed through the atomic force microscope in the manufacturing process of TFT substrate (0), TFT substrate (30), TFT substrate (60), and TFT substrate (90). Each image has the size of 1 μm on each side. Through the AFM, the arithmetic mean roughness Ra and the root mean square roughness Rq across the surface of the storage capacitance electrode 25 were obtained. The results are shown in Table 2.

TABLE 2

| Ashing Duration | 0 sec | 30 sec | 60 sec | 90 sec |
|---|---|---|---|---|
| Arithmetic Mean Roughness Ra (nm) | 1.75 | 2.82 | 3.75 | 6.30 |
| Root Mean Square Roughness Rq (nm) | 2.20 | 3.55 | 4.69 | 7.85 |

As seen from FIGS. 3(a) to 3(d) and the results of Table 2, as the ashing duration for the organic interlayer insulating layer 24 increases, the storage capacitance electrode 25 formed on that organic interlayer insulating layer 24 has a greater surface roughness. That is, the surface roughness of the storage capacitance electrode 25 is affected by the surface roughness of the organic interlayer insulating layer 24 underlying the storage capacitance electrode 25.

Figure 3:
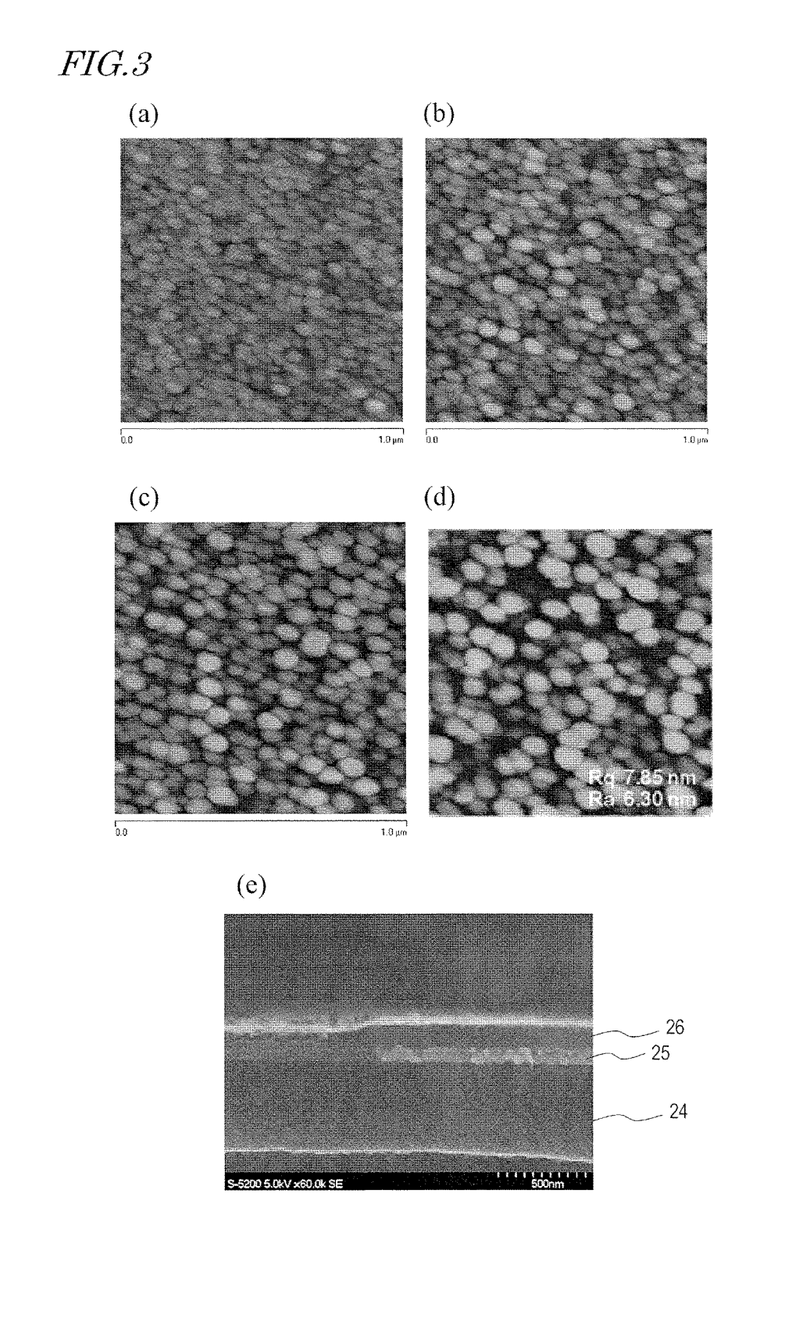
Figure 4:
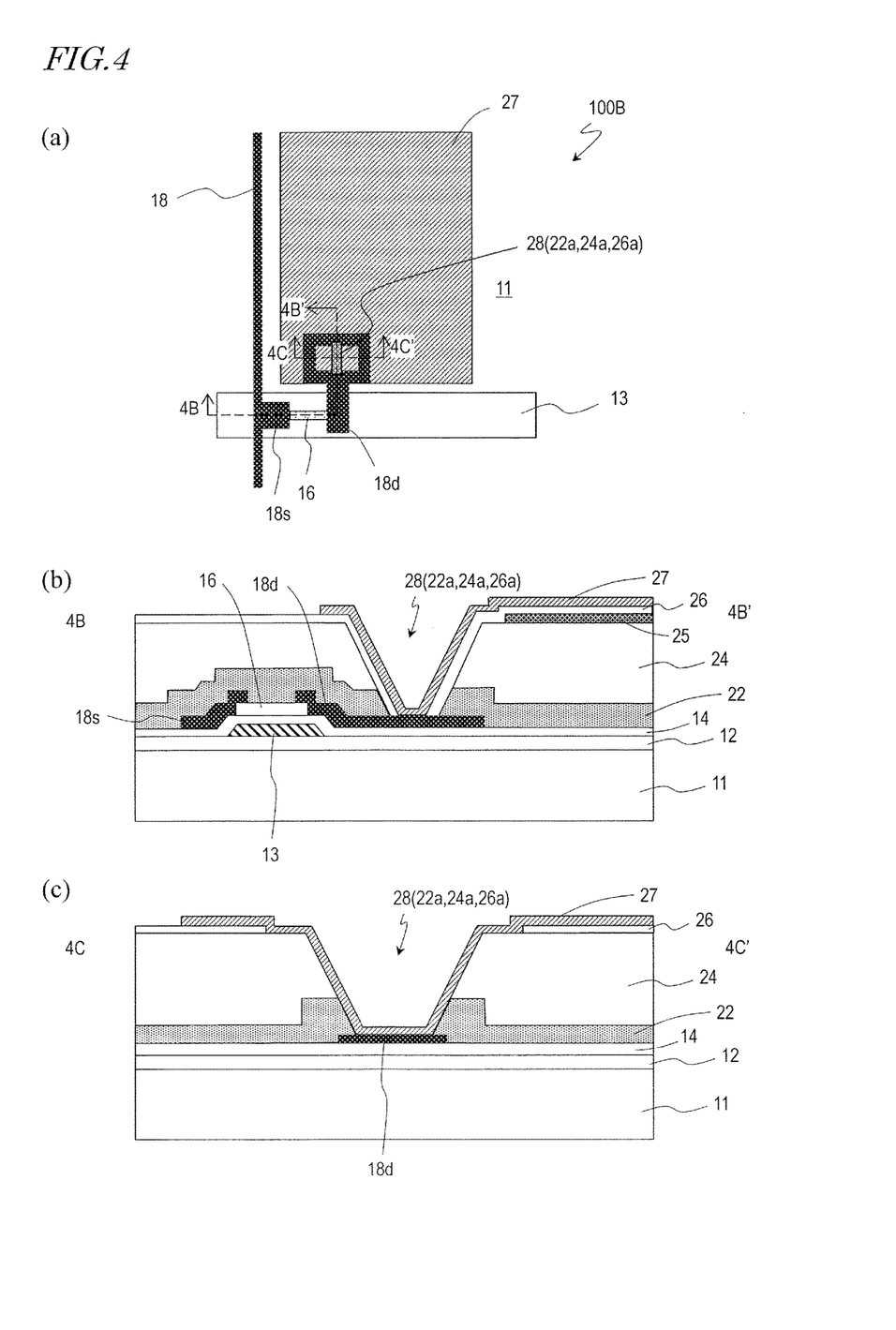

Also, as seen from the SEM image of the cross section of TFT substrate (60) which is shown in FIG. 3(e) (the full scale in the image: 500 nm), the InZnO-based transparent electrically-conductive layer that forms the storage capacitance electrode 25 has a columnar structure. It is estimated that this InZnO-based transparent electrically-conductive layer is amorphous and has a columnar structure so that it is dense, and therefore contributes to preventing the gases of $SiH_4$ and/or $H_2$ taken into the organic interlayer insulating layer 24 from leaking into the liquid crystal layer.

We produced TFT substrates with varying ashing durations for the organic interlayer insulating layer 24 in the same way as that described above. Five substrate samples were produced for each of the ashing durations. These TFT substrates were used to manufacture liquid crystal display panels (five samples for each duration). The manufactured liquid crystal display panels were stored in a high temperature, high humidity environment of 85° C. and 85 RH %, and the time of generation of bubbles was checked. As a result, in the LCDs for which the ashing duration was not more than 30 seconds, bubbles were generated in all five samples within 136 hours. In the LCDs for which the ashing duration was not less than 60 seconds, 159 hours passed before bubbles were generated in all five samples. That is, when the ashing duration is not less than 60 seconds, generation of bubbles can be suppressed. Note that when the ashing duration exceeds 90 seconds, thinning of the organic interlayer insulating layer 24 is large, and the surface roughness is also large. As a result, the yield of the first transparent electrically-conductive layer 25 decreases in some cases. Thus, the ashing duration is preferably not more than 90 seconds.

Note that, as a matter of course, when the conditions of the ashing are changed, the optimum ashing duration changes. As previously described with reference to Table 1 and Table 2 presented above, it is only necessary to appropriately adjust the ashing conditions and/or the ashing duration such that the arithmetic mean roughness Ra across the surface of the organic interlayer insulating layer 24 is not less than 3.45 nm and not more than 5.20 nm. Also, the transparent electrically-conductive layer 25, which is to be formed on the surface of the organic interlayer insulating layer 24, is preferably formed such that the arithmetic mean roughness Ra across the surface of the transparent electrically-conductive layer 25 is not less than 3.75 nm and not more than 6.30 nm.

Note that, herein, the parameter used for characterizing the surface roughness of the organic interlayer insulating layer 24 and the surface roughness of the transparent electrically-conductive layer 25 formed on the surface of the organic interlayer insulating layer 24 is the arithmetic mean roughness Ra (nm), although the root mean square roughness Rq (nm) can be used instead. That is, the root mean square roughness Rq across the surface of the organic interlayer insulating layer 24 is not less than 4.35 nm and not more than 6.67 nm, and the root mean square roughness Rq across the surface of the transparent electrically-conductive layer 25 is not less than 4.69 nm and not more than 7.85 nm.

FIGS. 4(a) to 4(c) illustrate a schematic configuration of another TFT substrate 100B included in a liquid crystal display panel according to an embodiment of the present invention. FIG. 4(a) is a schematic plan view of another TFT substrate 100B included in a liquid crystal display panel according to an embodiment of the present invention, showing a structure corresponding to one pixel (dot). FIG. 4(b) is a schematic cross-sectional view taken along line 4B-4B' of FIG. 4(a). FIG. 4(c) is a schematic cross-sectional view taken along line 4C-4C' of FIG. 4(a).

In the TFT substrate 100B, the pixel electrode 27 is connected with the drain electrode 18d of the thin film transistor in the contact hole 28 which includes the contact hole 22a of the inorganic insulating layer 22, the first contact hole 24a of the organic interlayer insulating layer 24, and the second contact hole 26a of the inorganic dielectric layer 26. The first contact hole 24a and the second contact hole 26a intersect with each other when viewed in a direction normal to the substrate 11. The TFT substrate 100B may have substantially the same configuration as that of the TFT substrate 100A except that the configuration of the contact hole 28 is different, and therefore, the description thereof is herein omitted.

When, as in the TFT substrate 100B, the first contact hole 24a and the second contact hole 26a which have rectangular shapes (exclusive of square shapes) are arranged so as to intersect with each other, the area of part of the drain electrode 18d extending over the pixel electrode 27 can be reduced, so that the pixel aperture ratio can be improved. Note that the contact hole 22a and the first contact hole 24a are arranged parallel with each other.

In the foregoing, as the TFT substrate for use in a VA mode liquid crystal display panel, a TFT substrate has been illustrated in which the pixel electrode 27 is provided on the liquid crystal layer side and the pixel electrode 27 has a plurality of slits, although a liquid crystal display panel and a TFT substrate used therein according to an embodiment of the present invention are not limited to this example but can be used in a FFS mode liquid crystal display panel. Also, a liquid crystal display panel according to an embodiment of the present invention is applicable to liquid crystal display panels of the vertical electric field mode other than the VA mode and to liquid crystal display panels of the lateral electric field mode other than the FFS mode.

INDUSTRIAL APPLICABILITY

The present invention is applicable to a wide variety of liquid crystal display panels.

REFERENCE SIGNS LIST 11 substrate
12 inorganic protection layer
13 gate electrode, gate bus line
14 gate insulating layer
16 semiconductor layer
18 source bus line
18s source electrode
18d drain electrode
22 inorganic insulating layer
24 organic interlayer insulating layer
25 storage capacitance electrode (first transparent electrically-conductive layer)
26 inorganic dielectric layer
27 pixel electrode (second transparent electrically-conductive layer)
28 contact hole
100A, 100B TFT substrate

The invention claimed is:
1. A liquid crystal display panel, comprising:
a liquid crystal layer;
first and second substrates arranged so as to oppose each other via the liquid crystal layer;
a thin film transistor supported on the first substrate;
an organic interlayer insulating layer covering the thin film transistor;
a first transparent electrically-conductive layer provided in a first region of a surface of the organic interlayer insulating layer; and
an inorganic dielectric layer covering the first transparent electrically-conductive layer and provided in a second region of the surface of the organic interlayer insulating layer which is different from the first region, the inorganic dielectric layer containing SiN, wherein an arithmetic mean roughness Ra of the first region and the second region of the surface of the organic interlayer insulating layer is not less than 3.45 nm and not more than 5.20 nm.

2. The liquid crystal display panel of claim 1, wherein an arithmetic mean roughness Ra of a surface of the first transparent electrically-conductive layer is not less than 3.75 nm and not more than 6.30 nm.

3. The liquid crystal display panel of claim 1, further comprising a second transparent electrically-conductive layer on the inorganic dielectric layer.

4. The liquid crystal display panel of claim 3, wherein the second transparent electrically-conductive layer is connected with a drain electrode of the thin film transistor in a contact hole which includes a first contact hole of the organic interlayer insulating layer and a second contact hole of the inorganic dielectric layer, an inner perimeter surface of the first contact hole being covered with the inorganic dielectric layer.

5. The liquid crystal display panel of claim 3, wherein the second transparent electrically-conductive layer is connected with a drain electrode of the thin film transistor in a contact hole which includes a first contact hole of the organic interlayer insulating layer and a second contact hole of the inorganic dielectric layer, the first contact hole and the second contact hole intersecting with each other when viewed in a direction normal to the first substrate.

6. A manufacturing method of a liquid crystal display panel which includes a liquid crystal layer and first and second substrates arranged so as to oppose each other via the liquid crystal layer, the method comprising the steps of:
   providing a first substrate;
   forming a thin film transistor on the first substrate;
   forming an organic interlayer insulating layer so as to cover the thin film transistor;
   ashing a surface of the organic interlayer insulating layer, thereby forming a first region and a second region of which an arithmetic mean roughness Ra is not less than 3.45 nm and not more than 5.20 nm;
   forming a first transparent electrically-conductive layer on the first region of the organic interlayer insulating layer; and
   forming, by CVD, an inorganic dielectric layer so as to cover the first transparent electrically-conductive layer and to be provided in the second region of the surface of the organic interlayer insulating layer which is different from the first region, the inorganic dielectric layer containing SiN.

7. The method of claim 6, wherein the ashing is performed in a gas atmosphere which contains oxygen.

* * * * *